United States Patent [19]

Clement

[11] Patent Number: 5,163,529
[45] Date of Patent: Nov. 17, 1992

[54] APPARATUS FOR SENSING POSITION OF A MEMBER IN A VEHICLE STEERING GEAR

[75] Inventor: Joseph Clement, Warren, Mich.

[73] Assignee: TRW Inc., Lyndhurst, Ohio

[21] Appl. No.: 689,006

[22] Filed: Apr. 22, 1991

[51] Int. Cl.$^5$ .............................................. B26D 7/09
[52] U.S. Cl. ................................. 180/140; 180/79.1; 280/91
[58] Field of Search ................... 180/79.1, 140; 280/91

[56] References Cited

U.S. PATENT DOCUMENTS

| | | |
|---|---|---|
| 4,645,025 | 2/1987 | Ohe et al. |
| 4,936,401 | 6/1990 | Baraszu et al. |
| 4,944,356 | 7/1990 | Oslapas |
| 5,083,626 | 1/1992 | Abe et al. ........................ 280/91 X |

*Primary Examiner*—H. Grant Skaggs
*Assistant Examiner*—Carol Lynn Druzbick
*Attorney, Agent, or Firm*—Tarolli, Sundheim & Covell

[57] ABSTRACT

A member of a vehicle steering gear moves longitudinally to effect steering movement of steerable wheels of a vehicle. A bearing is fixed in a housing and supports the member for the longitudinal movement. The bearing includes an electric coil for, when energized, generating lines of magnetic flux. A brass sleeve is fixed to the member and moves in opposite axial directions from a neutral position to change the reluctance of the path for the lines of magnetic flux and to provide a different reluctance at different positions of the brass sleeve relative to the bearing. The reluctance of the path decreases when the brass sleeve moves in one axial direction from the neutral position and increases when the brass sleeve moves in the other axial direction from the neutral position. A signal associated with the reluctance of the magnetic path is sensed to thereby provide a signal indicative of the position of the member.

2 Claims, 2 Drawing Sheets

APPARATUS FOR SENSING POSITION OF A MEMBER IN A VEHICLE STEERING GEAR

BACKGROUND OF THE INVENTION

1. Technical Field

The present invention relates to sensing the position of a movable member, and particularly relates to an apparatus for sensing the position of a member of a vehicle steering gear which moves longitudinally to effect steering movement of steerable wheels of the vehicle.

2. Background Art

A position sensor for sensing the position of a longitudinally movable member of a steering gear is disclosed in U.S. Pat. No. 4,944,356. This known position sensor comprises a magnet recessed into a longitudinally movable rack member of a rack and pinion steering gear for movement with the rack member. The position sensor further comprises a rack support bushing and coil assembly. The rack support bushing and coil assembly includes a bearing for supporting the rack member and a sensing coil incorporated into the bearing for determining the position of the magnet. The magnet is movable relative to the rack support bushing and coil assembly upon movement of the rack member. As the magnet moves into greater or lesser proximity to the sensing coil, the current within the sensing coil changes. A control module monitors the change in current within the sensing coil to determine the position of the magnet, and hence, the position of the rack member.

SUMMARY OF THE INVENTION

In accordance with the present invention, a vehicle steering apparatus comprises a member movable longitudinally to effect steering movement of steerable wheels of a vehicle. The apparatus comprises a housing and a bearing fixed in the housing and supporting the member for the longitudinal movement. The bearing includes electric coil means which, when energized, generates a magnetic field. The lines of flux of the magnetic field pass through a magnetic path extending through the member. The member is made of a material having a low reluctance. A part is fixed to the member and is in the magnetic path for the lines of flux. The part is made of a material having a relatively high reluctance. The part is movable in opposite directions from a neutral position to change the reluctance of the magnetic path for the lines of flux. When the member and the part move within the magnetic field, the reluctance of the magnetic path for the lines of flux changes. A different reluctance is provided at different positions of the part and the member. The reluctance of the magnetic path decreases when the part moves in one direction away from the neutral position and increases when the part moves in the other direction away from the neutral position When the reluctance changes, the current flow through the electric coil means changes. A means senses a signal associated with the change in current flow through the electric coil means to thereby provide a signal indicative of the position of the member.

Preferably, the bearing includes a plastic bearing sleeve. The electric coil means is wound around the plastic bearing sleeve. The bearing has an opening through which the member extends. The portion of the member positioned in the opening of the plastic bearing sleeve ha an outer diameter corresponding to the diameter of the opening through the plastic bearing sleeve. The par fixed to the member includes a nonferrous metal sleeve coaxial with the member. The nonferrous metal sleeve has an outer diameter which also corresponds to the diameter of the opening through the plastic bearing sleeve. The nonferrous metal sleeve is preferably made of brass and is preferably press fit onto the movable member.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT

Figure 1:
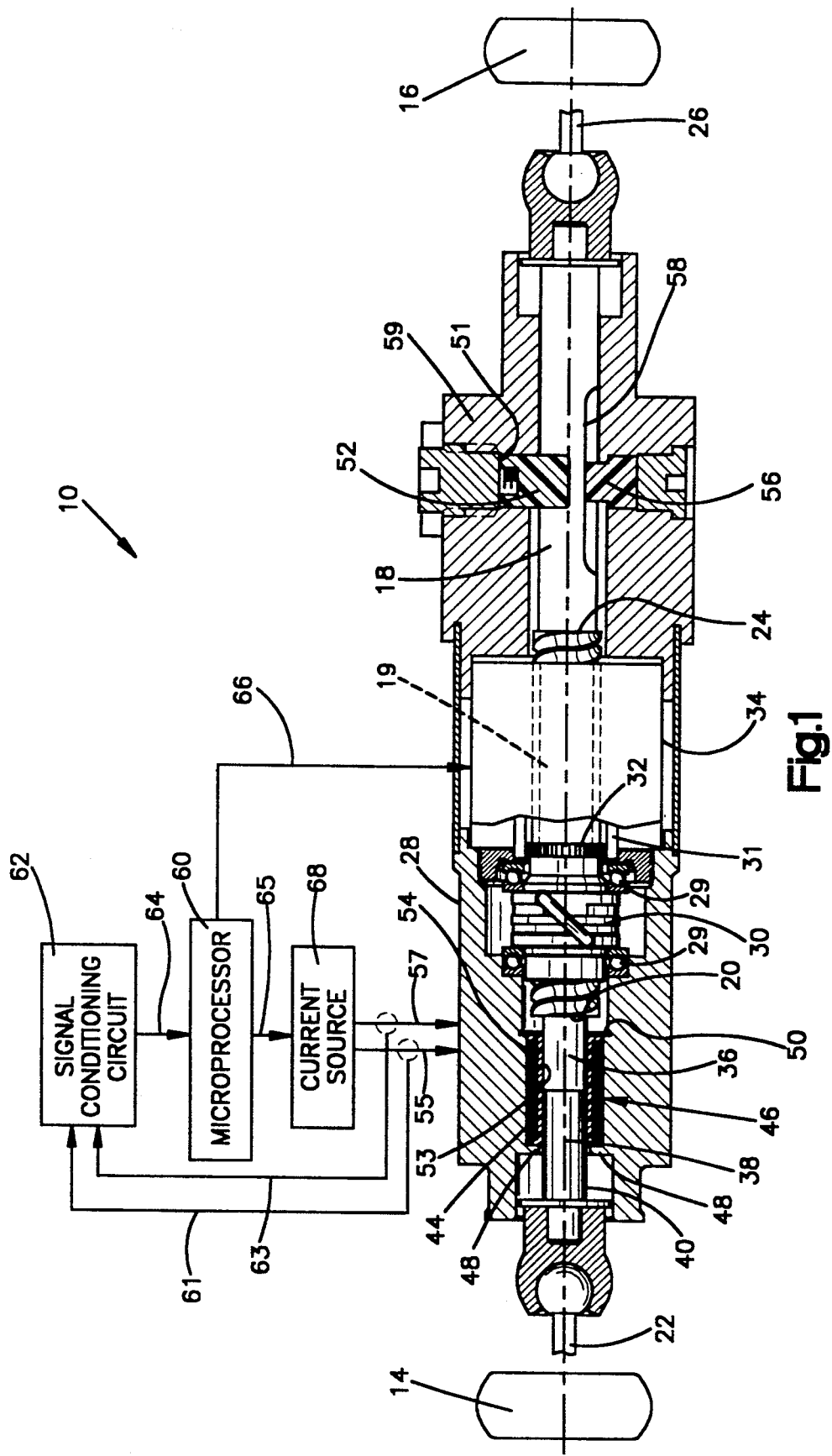
FIG. 1 is a schematic diagram of a vehicle steering system incorporating an apparatus constructed in accordance with the present invention.

The present invention relates to a vehicle steering apparatus and more specifically relates to sensing the position of a movable member of the steering apparatus. The steering apparatus to which the present invention is applied may take a variety of forms. By way of example, the present invention is shown in FIG. 1 as applied to a vehicle rear wheel steering gear 10. The steering gear 10 steers rear steerable wheels 14, 16 in response to signals indicative of vehicle operating parameters such as the direction and amount of steering of front wheels (not shown) of the vehicle.

The steering gear 10 includes a longitudinally movable member 18 having a portion 19 in the form of a ball screw made, preferably, of SAE 1040 steel. The ball screw portion 19 has one end 20 and another end 24. One end of the member 18 is drivingly connected through a steering linkage 22 to the rear steerable wheel 14 and the other end of the member 18 is drivingly connected through a steering linkage 26 to the rear steerable wheel 16. When the member 18 moves longitudinally in one direction, the rear wheels 14, 16 are steered in one direction. When the member 18 moves longitudinally in the other direction, the rear wheels 14, 16 are steered in the opposite direction.

The steering gear 10 further includes a housing portion 28 connectable to a frame part of the vehicle. The housing portion 28 is preferably made of 6061-TC aluminum. A ball nut assembly 30 is disposed in the housing portion 28 and is rotatably supported in the housing portion 28 by bearings 29 in a known manner. The ball screw portion 19 extends through the ball nut assembly 30 and is operatively connected thereto. The ball nut assembly 30 is of known construction and is preferably of the recirculating ball type. Since the ball nut assembly 30 is well known, it will not be described in detail.

An electric motor 34 is located adjacent the ball nut assembly 30 and has its output shaft drivingly connected through a collar 31 to a spline portion 32 of the ball nut assembly 30. When the output shaft of the electric motor 34 rotates in one direction, the ball nut assembly 30 rotates in one direction so as to drive the member 18 longitudinally in one direction which, in turn, steers the rear wheels 14, 16 in one direction. When the output shaft of the electric motor 34 rotates in the other direction, the ball nut assembly 30 rotates in the opposite direction so as to drive the member 18 longitudinally in the opposite direction which, in turn, steers the rear wheels 14, 16 in the opposite direction.

Figure 2:
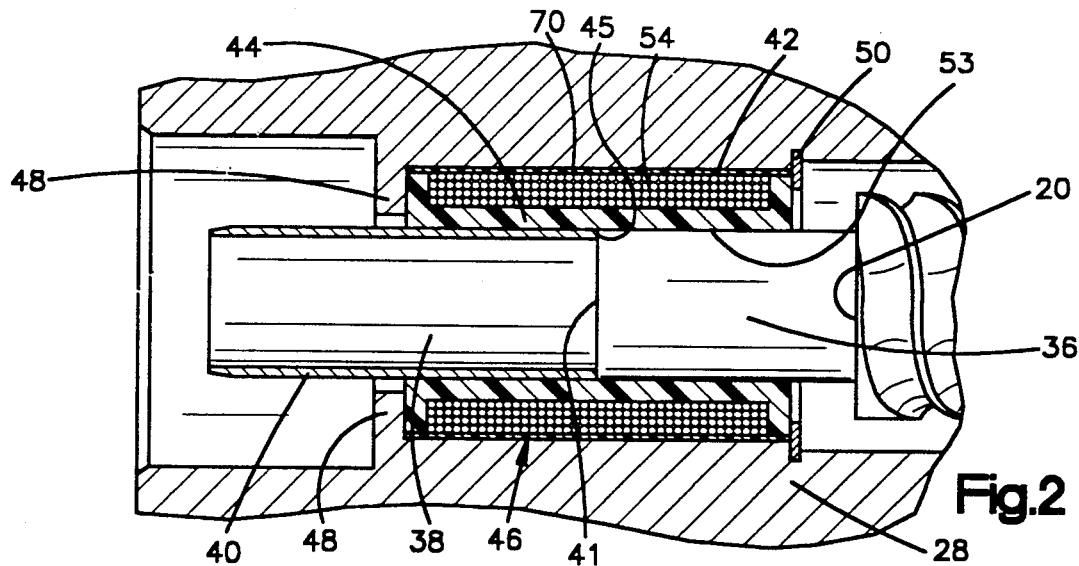
FIG. 2 is an enlarged view of a portion of the vehicle steering system of FIG. 1 showing a longitudinally movable member in an initial position.

The left end portion of the member 18 as shown in FIG. 1 has a larger diameter portion 36 and a smaller diameter portion 38 extending away from the larger diameter portion 36 to form a shoulder 41 therebetween as shown in FIG. 2. A nonferrous metal sleeve 40, preferably made of CDA-360 brass, is elongate and is press fit onto the smaller diameter portion 38 of the member 18. The brass sleeve 40 is coaxial with the member 18 and has an outer diameter corresponding to the outer diameter of the larger diameter portion 36 of the member 18. One end 45 of the brass sleeve 40 abuts against the shoulder 41 formed between the larger diameter portion 36 of the member 18 and the smaller diameter portion 38 of the member 18.

The member 18 is supported and guided for longitudinal movement by a bearing 46, a yoke 52, and a support member 56 (see FIG. 1). The bearing 46 is disposed in a chamber 42 of the housing portion 28 of the steering gear 10. The yoke 52 is disposed in a chamber 51 of a housing portion 59 of the steering gear 10. The yoke 52 circumscribes part of the member 18. The support member 56 engages flat surfaces 58 of the member 18 to guide and support the member 18 and to prevent the member 18 from rotating. Only one of the flat surfaces 58 is shown in the drawings.

The bearing 46 includes a sleeve 44 (best shown in FIG. 2) made of plastic and an electric coil 54 made of electrical wire wrapped around the plastic bearing sleeve 44. The plastic sleeve 44 is preferably made of Delrin AF 500 made by E. I. Dupont de Nemours Co. The plastic bearing sleeve 44 and the electrical wire wrapped therearound are encapsulated in a suitable material 70 and in a known manner. The bearing 46 is fixedly located in the housing portion 28. The bearing 46 is fixedly positioned in the chamber 42 by an annular shoulder 48 of the housing portion 28 which engages one axial end of the bearing 46 and by a snap ring 50 which engages the other axial end of the bearing 46.

The plastic bearing sleeve 44 has an opening 53 through which the brass sleeve 40 and the larger diameter portion 36 of the member 18 extend. The inner diameter of the plastic bearing sleeve 44 corresponds to the outer diameter of the larger diameter portion 36 of the member 18 and the outer diameter of the brass sleeve 40. The surface of the plastic bearing sleeve 44 defining the opening 53 is a bearing surface which supports the member 18 for longitudinal movement thereof along its longitudinal central axis.

Referring to FIG. 2, the member 18 is shown in a neutral position relative to the bearing 46 which corresponds to the rear wheels 14, 16 being in a straight-ahead position. The brass sleeve 40 is movable within the opening 53 in the plastic bearing sleeve 44. When the member 18 is in the neutral position shown in FIG. 2, the end 45 of the brass sleeve 40 is located midway of the electric coil 54 wrapped around the plastic bearing sleeve 44. The brass sleeve 40 and the larger diameter portion 36 of the member 18 are located in a magnetic field generated by current flow through the electric coil 54. The brass sleeve 40 has a higher reluctance than the steel member 18 because of the different materials of which they are made.

When the member 18 is in the neutral position shown in FIG. 2, the reluctance of the magnetic path for the magnetic flux lines of the magnetic field generated by current flow through the electric coil 54 is at a predetermined value. A predetermined amount of current flows through the electric coil 54 when the reluctance is at the predetermined value. Thus, the predetermined amount of current flows through the electric coil 54 when the member 18 is in the neutral position shown in FIG. 2.

Figure 3:
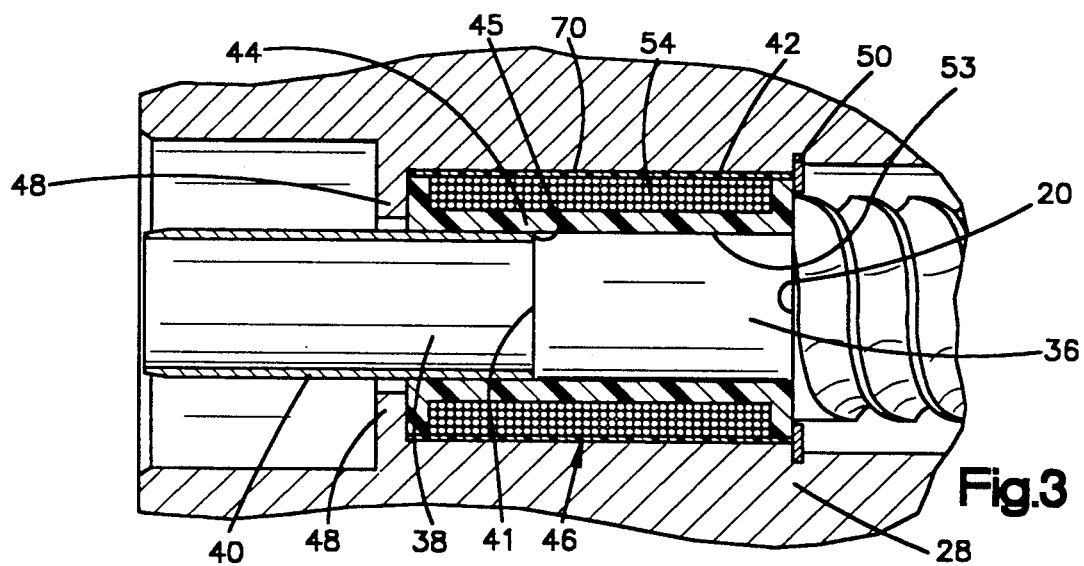
FIGS. 3 and 4 are views similar to FIG. 2 showing the longitudinally movable member in different positions.

When the rear wheels 14, 16 are turned in one direction, the member 18 moves, for example, from the neutral position as shown in FIG. 2 to a position such as shown in FIG. 3. When the member 18 is in the position shown in FIG. 3, more of the smaller diameter portion 38 of the member 18 is outside the opening 53 of the plastic bearing sleeve 44 and more of the larger diameter portion 36 of the member 18 is inside the opening 53. Since more of the smaller diameter portion 38 is outside the opening 53, more of the brass sleeve 40 is outside the opening 53 resulting in a higher reluctance of the magnetic path for the magnetic flux lines. Thus, the reluctance of the magnetic path of FIG. 3 is higher than the reluctance of the magnetic path of FIG. 2 because more of the magnetic flux lines encounter the relatively higher reluctance brass sleeve 40 when the parts are in the position of FIG. 3. Since the reluctance of the magnetic path of FIG. 3 is higher than the reluctance of the magnetic path of FIG. 2, the amount of current flow through the electric coil 54 when the parts are in the position of FIG. 3 is below the predetermined amount of current flow through the electric coil 54 when the parts are in the neutral position of FIG. 2.

Figure 4:
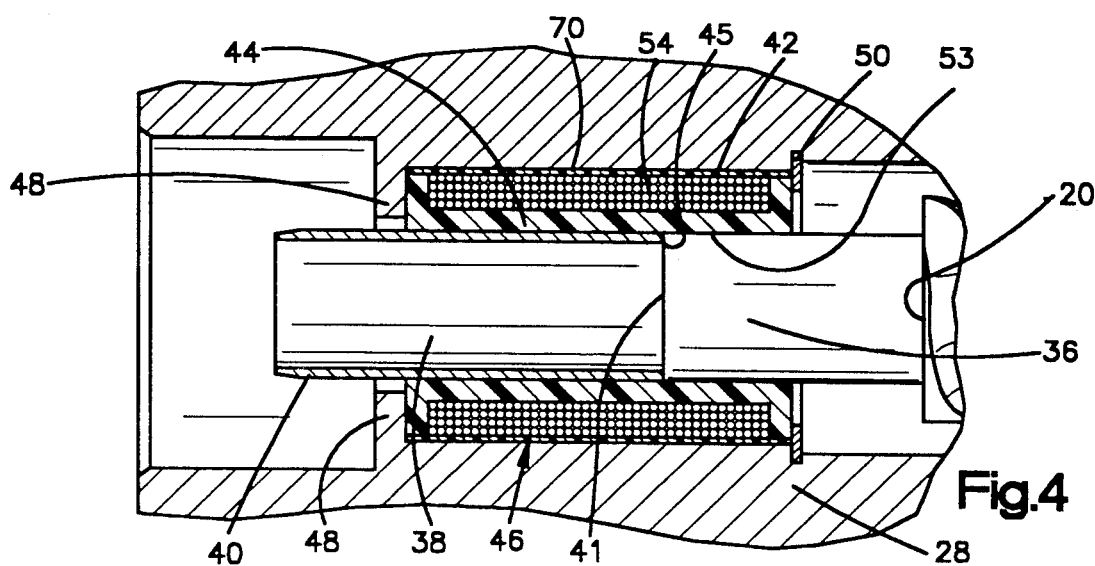

When the rear wheels 14, 16 are turned in the opposite direction, the member 18 moves, for example, from the neutral position shown in FIG. 2 to a position such as shown in FIG. 4. When the member 18 is in the position shown in FIG. 4, less of the smaller diameter portion 38 of the member 18 is outside the opening 53 of the plastic bearing sleeve 44 and less of the larger diameter portion 36 of the member 18 is inside the opening 53. Since less of the smaller diameter portion 38 is outside the opening 53, less of the brass sleeve 40 is outside the opening 53 resulting in a lower reluctance of the magnetic path for the magnetic flux lines. Thus, the reluctance of the magnetic path of FIG. 4 is lower than the reluctance of the magnetic path of FIG. 2 because less of the magnetic flux lines encounter the relatively higher reluctance brass sleeve 40 when the parts are in the position of FIG. 4. Since the reluctance of the magnetic path of FIG. 4 is lower than the reluctance of the magnetic path of FIG. 2, the amount of current flow through the electric coil 54 when the parts are in the position of FIG. 4 is above the predetermined amount of current flow through the electric coil 54 when the parts are in the neutral position of FIG. 2.

It should be apparent that the brass sleeve 40 moves within the opening 53 in the plastic bearing sleeve 44 to change the reluctance of the magnetic path for the magnetic flux lines generated by current flow through the electric coil 54 and to provide a different reluctance at different positions of the brass sleeve 40 relative t the bearing 46. Different amounts of current flow through the electric coil 54 at different reluctances. The amount of current flow through the electric coil 54 therefore depends upon the position of the brass sleeve 40 relative to the bearing 46. The position of the brass sleeve 40 relative to the bearing 46 depends upon the position of the member 18 relative to the bearing 46. Thus, the amount of current flow through the electric coil 54 depends upon the position of the member 18 relative to the bearing 46.

As previously stated, the sleeve 40 is made of a nonferrous metal such as brass. When the sleeve 40 is made of a nonferrous metal, the attraction of any ferrous contaminants to the sleeve 40 is non-existent. The attraction of ferrous contaminants to the sleeve 40 is undesirable because such contaminants may enter between the sleeve 40 and the plastic bearing sleeve 44. If this occurs, undue and excessive wear occurs between the sleeve 40 and the plastic bearing sleeve 44 upon relative movement therebetween. Thus, by having the sleeve 40 made of a nonferrous metal, undue and excessive wear as a result of contaminants entering between the sleeve 40 and the plastic bearing sleeve 44 is at a minimum.

Two terminals 55, 57 (FIG. 1) of the electric coil 54 are connected to the output of an alternating current source 68. A microprocessor 60 provides a control signal on line 65 to control the alternating current source 68. The current source 68 supplies an alternating current through the electric coil 54 to generate the magnetic field around the electric coil 54. A signal conditioning circuit 62 senses in a known way via lines 61, 63 the voltage drop across the terminals 55, 57 of the electric coil 54. The signal conditioning circuit 62 is preferably that circuit known as a digital auto-plex circuit supplied by Lucas Schaevitz Corporation. The voltage drop across the terminals 55, 57 varies as a function of the amount of current flow through the electric coil 54 which, in turn, depends upon the position of the rear steerable wheels 14, 16. The circuit 62 provides an output signal on line 64 which varies as a function of the voltage drop across the terminals 55, 57 and, therefore, the position of the rear steerable wheels 14, 16.

The microprocessor 60 receives input signals indicative of vehicle operating parameters, such as steering wheel position, the position of the front steerable wheels, and the position of the rear steerable wheels 14, 16. The microprocessor 60 processes the input signals in accordance with a preprogrammed procedure stored in the internal memory of the microprocessor 60. As shown in FIG. 1, the microprocessor 60 generates a control signal on line 65 to control the alternating current source 68 and a control signal on line 66 to control the electric motor 34 in response to the input signals indicative of vehicle operating parameters including the signal on line 64 from the circuit 62 indicative of the position of the rear steerable wheels 14, 16. Microprocessors are readily available in the commercial market. Their internal structure and operation are well known in the art and, therefore, the microprocessor 60 will not be described in detail herein.

From the above, it should be understood that the electric coil 54 of the bearing 46 functions as a position sensor for providing a signal indicative of the position of the member 18. Also, it should be understood that the plastic bearing sleeve 44 acts as a bearing surface to support the member 18 for longitudinal movement along its longitudinal central axis. Thus, the bearing 46 provides a dual function as a position sensor for sensing the position of the member 18 and as a bearing for supporting the member 18 for longitudinal movement.

From the above description of the present invention, those skilled in the art will perceive improvements, changes and modifications. Such improvements, changes and modifications within the skill of the art are intended to be covered by the appended claims.

Having described the invention, the following is claimed:

1. A vehicle steering apparatus comprising:
   a member movable longitudinally to effect steering movement of steerable wheels of a vehicle;
   a housing;
   a bearing fixed in said housing and supporting said member for said longitudinal movement;
   said bearing including electric coil means for, when energized, generating magnetic flux lines;
   said bearing including a bearing sleeve having an opening through which said member extends, said electric coil means being wound around said bearing sleeve, a portion of said member being positioned in the opening in said bearing sleeve, said portion of said member having an outer diameter corresponding to the diameter of said opening in said bearing sleeve;
   a part fixed to said member and in the path for the magnetic flux lines and movable in opposite directions from a neutral position to change the reluctance of the path of the magnetic flux lines and to provide a different reluctance of the path for the magnetic flux lines at different positions of said part relative to said bearing, the reluctance of the path decreasing when said part moves in one direction from the neutral position and increasing when said part moves in the other direction from the neutral position;
   said part fixed to said member including a metal sleeve coaxial with said member, said metal sleeve having an outer diameter corresponding to the diameter of said opening in said bearing sleeve; and
   means for sensing a signal associated with the reluctance to thereby provide a signal indicative of the position of said member.

2. A vehicle steering apparatus as defined in claim 1 wherein said metal sleeve is made of brass and is press fit onto said member.

* * * * *